United States Patent [19]

Lloyd

[11] Patent Number: 5,725,203
[45] Date of Patent: Mar. 10, 1998

[54] LOW COST JOUNCE BUMPER

[75] Inventor: David Bowman Lloyd, Canton, Mich.

[73] Assignee: Ford Global Technologies, Inc., Dearborn, Mich.

[21] Appl. No.: 586,355

[22] Filed: Jan. 16, 1996

[51] Int. Cl.[6] .............................. F16F 1/36; B60G 11/22
[52] U.S. Cl. .................. 267/153; 267/141; 267/292; 267/140
[58] Field of Search .................. 267/257, 258, 267/153, 152, 220, 259, 48, 292, 293, 294, 140, 141, 141.1–141.7, 140.3, 140.4, 140.5, 139, 254; 248/634, 635, 638; 280/663, 671, 666; 16/86 A; 293/102, 142, 155, 154; 188/268; 92/85 R

[56] References Cited

U.S. PATENT DOCUMENTS

| | | | |
|---|---|---|---|
| 1,930,189 | 10/1933 | Barbara | 293/142 |
| 2,007,832 | 7/1935 | Nelson | 267/257 |
| 2,215,703 | 9/1940 | Jackson | 267/257 |
| 2,256,752 | 9/1941 | Saurer | 267/141.5 |
| 2,321,832 | 6/1943 | Leighton | 280/666 |
| 2,430,709 | 11/1947 | Devorss, Jr. | 267/140.3 |
| 2,553,627 | 5/1951 | Barlow | 16/86 A |
| 2,596,780 | 5/1952 | Meyers et al. | 16/86 A |
| 2,659,595 | 11/1953 | Coda | 267/292 |
| 2,678,210 | 5/1954 | Reuter | 267/257 |
| 2,707,100 | 4/1955 | Schilberg | 267/254 |
| 2,736,570 | 2/1956 | Crane | 280/666 |
| 2,813,712 | 11/1957 | Stanis | 267/257 |
| 2,817,510 | 12/1957 | Hoban | 267/257 |
| 2,969,656 | 1/1961 | Reuter | 267/292 |
| 3,101,228 | 8/1963 | Olowinski | 267/140.4 |
| 3,118,659 | 1/1964 | Paulsen | 267/140.4 |
| 3,331,600 | 7/1967 | Goetz et al. | 267/294 |
| 3,350,042 | 10/1967 | Stewart et al. | 267/141.4 |
| 3,362,040 | 1/1968 | Gurzenda | 16/86 A |
| 3,731,896 | 5/1973 | Fehlberg | 267/140.3 |
| 3,838,850 | 10/1974 | Chorkey | 267/141 |
| 3,841,682 | 10/1974 | Church et al. | 293/142 |
| 3,879,024 | 4/1975 | Scott et al. | 267/140.4 |
| 3,975,007 | 8/1976 | Chorkey | 267/141.4 |
| 4,198,037 | 4/1980 | Anderson | 267/153 |
| 4,418,898 | 12/1983 | Atsumi et al. | 267/294 |
| 4,427,189 | 1/1984 | Kimura et al. | 267/139 |
| 4,971,456 | 11/1990 | Hori | 267/140.4 |
| 5,052,665 | 10/1991 | Sakuragi . | |
| 5,074,535 | 12/1991 | Colford | 267/293 |
| 5,374,038 | 12/1994 | Hein | 267/140.5 |
| 5,419,539 | 5/1995 | Bressler | 267/292 |
| 5,551,661 | 9/1996 | Bunker | 267/141 |
| 5,560,590 | 10/1996 | Reast | 267/269 |

FOREIGN PATENT DOCUMENTS

| | | | |
|---|---|---|---|
| 1091673 | 6/1953 | France | 267/140.4 |
| 1048444 | 1/1959 | Germany | 267/294 |
| 1114062 | 9/1961 | Germany | 267/153 |
| 4136598 | 5/1993 | Germany | 267/141 |
| 3219129 | 9/1991 | Japan | 267/141 |
| 5126187 | 5/1993 | Japan | 267/141 |
| 1753089 | 8/1992 | U.S.S.R. | 267/292 |

*Primary Examiner*—Douglas C. Butler
*Attorney, Agent, or Firm*—Gregory P. Brown

[57] ABSTRACT

An jounce bumper apparatus has an elastomeric body (18) bonded directly to a head (30) of a threaded fastener (20) for providing controlled impact of a second member 46, such as a lower control arm of a vehicle suspension, with an adjacent first member (48), such as a vehicle frame. Bonding strength may be enhanced by the use of an enlarged head (30) combined with forming circumferential grooves thereon.

11 Claims, 1 Drawing Sheet

LOW COST JOUNCE BUMPER

BACKGROUND OF THE INVENTION

1. Field of the Invention

This invention relates generally to occupant elastomeric bodies disposed on automotive components for reducing the harshness of the impact of two metallic components. More specifically, the present invention relates to a low cost jounce bumper apparatus for use in suspension systems.

2. Disclosure Information

Jounce bumpers have been known for use in suspensions for motor vehicles for some time. A jounce bumper cushions impacts between two metallic components, such as a suspension arm and a frame rail. It is desirable to use some form of resilient member fastened two one of the two components at a point where contact is likely to occur under extreme suspension travel. The use of a resilient member serves cushion the impact, thereby to reduce noise and other undesirable consequences of the impact.

Conventional jounce bumpers of this type include a resilient bumper disposed in a metallic seat. The seat is secured to the suspension arm or the frame rail with fasteners. The seat is adapted to retain the resilient bumper throughout the life of the jounce bumper. The loads imposed on the jounce bumper place considerable strain on the resilient bumper, commonly causing the bumper to shear away from the seat. For this reason, a variety of solutions have been devised aimed at improving the retention of the resilient member within the seat.

It would therefore be desirable to have a simple, low cost jounce bumper capable of withstanding the impacts associated with the operation of a motor vehicle.

SUMMARY OF THE INVENTION

The present invention provides a low cost jounce bumper apparatus a motor vehicle, that eliminates the need for a separate seat to be installed between the elastomeric member and the threaded fastener used to secure the jounce bumper to a component of the vehicle.

In the presently preferred embodiment, a jounce bumper apparatus for use in a suspension system of a motor vehicle includes a threaded fastener with a head having an upper bonding surface and a threaded portion extending from the head.

The jounce bumper also includes an elastomeric body bonded directly to the upper bonding surface of the head and extending upward therefrom.

It is an advantage of this jounce bumper apparatus to provide a simple, low cost jounce bumper capable of repeatedly sustaining the impacts associated with the operation of the motor vehicle without the need for a cup or other additional retaining device.

Other objects, features and advantages of the present invention will become apparent to those skilled in the art from the drawings, detailed description and claims which follow.

DETAILED DESCRIPTION OF THE PREFERRED EMBODIMENTS

Figure 1:
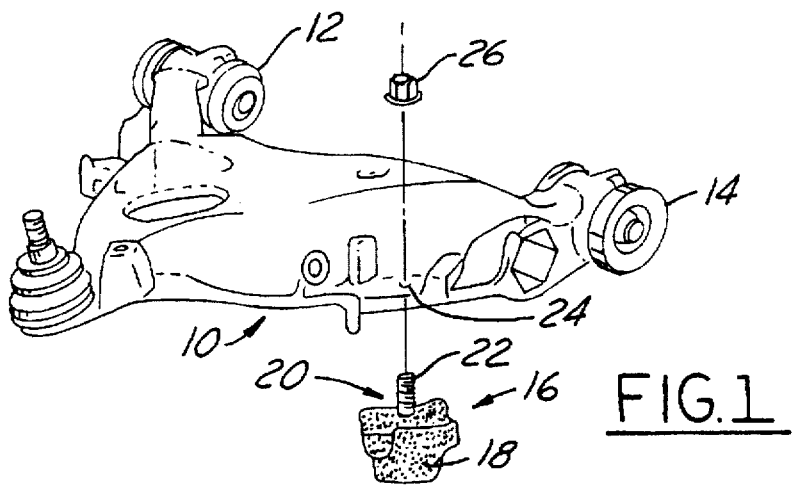
FIG. 1 is perspective drawing of a suspension arm incorporating a jounce bumper apparatus according to the present invention.

Referring now to the figures, FIG. 1 illustrates a lower control arm 10 from a suspension of a motor vehicle. A pair of inner pivots 12, 14 permit the lower arm to rotate relative to a longitudinal axis of the motor vehicle. A jounce bumper 16 includes an resilient or elastomeric body 18 bonded directly to a threaded fastener 20. A threaded portion 22 of the threaded fastener 20 extends through an aperture 24 and engages a threaded nut 26 to securely fasten the jounce bumper 16 to the lower control arm 10. It should be apparent to those skilled in the art that the jounce bumper 16 could be fastened to a frame member (not shown) while providing the equivalent operability.

Figure 2:
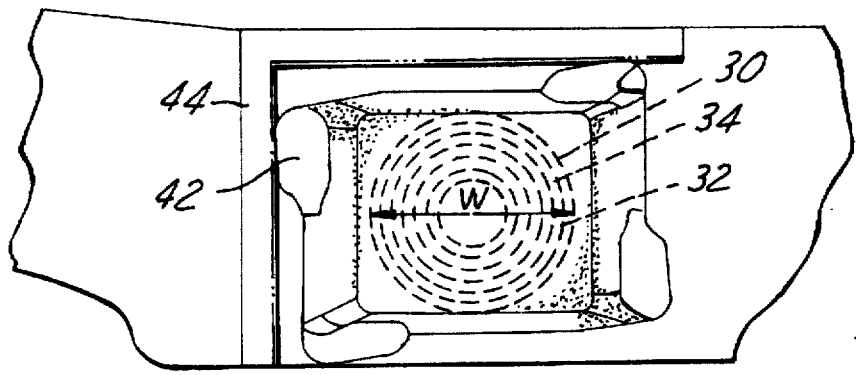
FIG. 2 is a top view of a jounce bumper apparatus according to the present invention.
Figure 3:
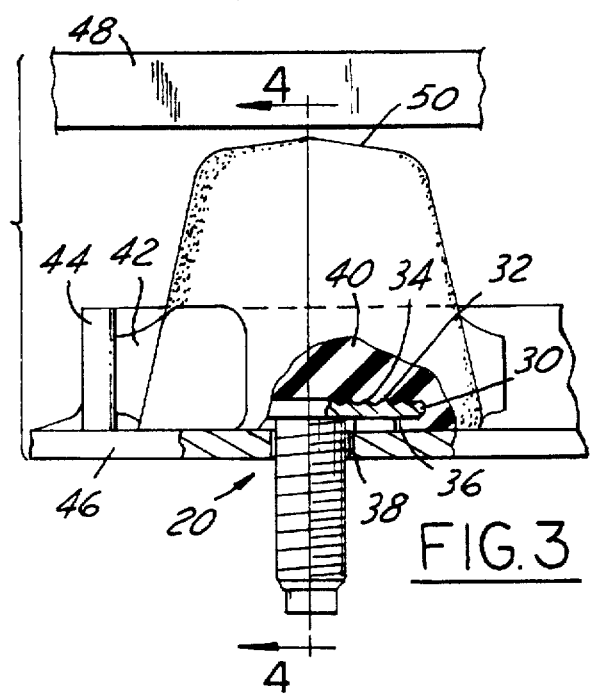
FIG. 3 is a partially sectioned side view of a jounce bumper apparatus according to the present invention.
Figure 4:
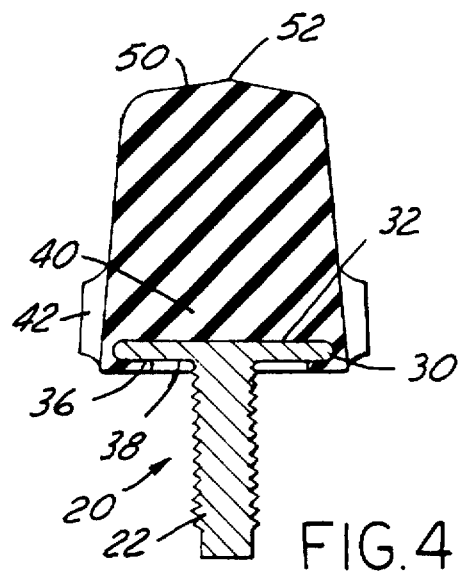
FIG. 4 is a sectional view taken from FIG. 3 showing a jounce bumper apparatus according to the present invention.

Referring now to FIGS. 2–4, the jounce bumper 16 will now be described in greater detail. A head 30, which may be coined or rolled to present an enlarged upper bonding surface 32, characterized by an increased width, W. The is upper bonding surface 32 may also be formed with grooves, or similar shapes which would equivalently increase the surface area for improved bonding. It should be noted that in its finished form, the bonding surfaces of the threaded fastener should be free from sharp edges and burrs.

A lower surface 36 of the head 30 surrounds a shoulder 38, disposed between the head 30 and the threaded portion 22 of the threaded fastener 20. The shoulder 38 serves as a bearing surface for engagement with the lower control arm 10 immediately around the periphery of the aperture 24. The shoulder 38 has a width that is smaller than the width, W, of the head 30 while being greater than the width of the threaded portion 22.

The elastomeric body 18 includes a base portion 40 which may be bonded directly to the upper bonding surface 32. In the preferred embodiment, the base portion encapsulates the head 30 forming seal members 43 bonded to the lower bonding surface 36. It should be noted that it is desirable to prevent any elastomeric material from bonding to the bearing surface of the shoulder 38 to improve the retention of the jounce bumper under compressive loading.

A protuberance 42 extends radially from the base portion of the elastomeric body. Multiple protuberances may be provided, depending on the manufacturing flexibility required for the given design. The protuberance 42 engages a stop member 44 disposed on a second member 46 (such as the lower control arm 10) to prevent rotation of the jounce bumper 16 during installation of the threaded nut 26 on the threaded fastener 20. The protuberance 42 establishes clearance between the elastomeric body 18 and the stop member 44 during full compression, which causes the elastomeric body 18 to expand. Without this space, the elastomeric body could expand and cover the stop member 44 where it could be damaged due to pinching between a first member 48 (such as a frame rail).

The elastomeric body 18 extends upward toward a contact surface 50. In the preferred embodiment, the elastomeric body 18 tapers from the base portion 40 to a narrower width at the top adjacent to the contact surface 50. The contact surface may simply be flat, or as shown, a center portion 52 may extend further from the base portion 40 than does the periphery of the contact surface 50. Together, independently or combined, these shapes provide progressive resistance to compression. As additional material contacts the second member, the resistance to deflection increases. Similarly, as the amount of material being deformed increases, the greater the resistance to compression.

The elastomeric member 18 may be comprised of natural or synthetic rubber. The threaded fastener may simply be molded in place, or a bonding agent, such as any commonly available rubber to metal bonding adhesive for use with natural rubber may be applied to the bonding surfaces of the head 30 to provide enhanced the bond strength.

Operation of the present invention will now be described. As the second member 46 approaches the first member 48, such as when the lower control arm 10 pivots toward the frame of the vehicle, the center portion of the jounce bumper contacts the first member 48. Further movement of the second member is progressively resisted by the compression of the elastomeric body 18. Eventually, the compressive load may fully compress the elastomeric body 18, causing the first member 48 to contact the stop member 44. The stop member 44 prevents further compression of the elastomeric body 18 and stops the movement of the second member 46 relative to the first member 48.

The foregoing description presents a single application of the present invention. Details of construction have been shown and described for purposes of illustration rather than limitation. Modifications and alterations of the invention may occur to those skilled in the art. Therefore, it is the following claims, including all equivalents, that define the scope of my invention.

I claim:

1. A jounce bumper apparatus for use in an suspension system of a motor vehicle, said jounce bumper apparatus consisting of:

a threaded fastener having a head, a threaded portion extending therefrom and a shoulder disposed between said threaded portion and said head and having a width smaller than a width of said head of said threaded fastener yet greater than a width of said threaded portion;

said head having an upper bonding surface and a lower bonding surface; and an elastomeric body bonded directly to said head and including a base portion extending upward from said upper bonding surface and a seal member bonded to said lower bonding surface.

2. A jounce bumper apparatus according to claim 1, wherein said upper bonding surface has circumferential grooves formed therein for improved bonding with said elastomeric body.

3. A jounce bumper apparatus according to claim 1, wherein said elastomeric body further comprises a contact face, said contact face having a center portion extending further from said base portion than a periphery of said contact face, thereby providing progressively increased resistance to compression.

4. A jounce bumper apparatus according to claim 1, wherein said elastomeric body further comprises a protuberance disposed on a periphery of a base portion, said protuberance being operative to prevent rotation of said jounce bumper apparatus during installation.

5. A jounce bumper apparatus for use in an suspension system of a motor vehicle, said jounce bumper apparatus comprising:

a threaded fastener having a head, a threaded portion, and a shoulder disposed therebetween;

said shoulder having a width smaller than a width of said head of said threaded fastener yet greater than a width of said threaded portion;

said head having an upper bonding surface with circumferential grooves formed therein and a lower bonding surface; and an elastomeric body having a base portion encapsulating and bonded directly to said head and extending upward from said upper bonding surface and a sealing member bonded to said lower bonding surface.

6. A jounce bumper apparatus according to claim 5, wherein said elastomeric body further comprises a contact face, said contact face having a center portion extending further from said base portion than a periphery of said contact face, thereby providing progressively increased resistance to compression.

7. A jounce bumper apparatus according to claim 5, wherein said base portion of said elastomeric body further comprises a protuberance disposed on a periphery of said base portion, said protuberance being operative to prevent rotation of said jounce bumper apparatus during installation.

8. A jounce stop apparatus for use in an suspension system of a motor vehicle, said jounce stop apparatus comprising:

a first member fixedly disposed on the motor vehicle;

a second member movably disposed on the motor vehicle and adapted to move toward said first member during operation of the motor vehicle, said second member having an aperture therethrough and a stop member disposed thereon, said stop member extending away from said second member toward said first member a predetermined distance;

a jounce bumper comprising:

a threaded fastener having a head and a threaded portion for extending through said aperture and receiving a threaded nut thereon;

a shoulder disposed between head and said threaded portion, said shoulder having a width smaller than a width of said head of said threaded fastener yet greater than a width of said threaded portion;

an upper bonding surface disposed on said head of said threaded fastener;

a lower bonding surface disposed on said head of said threaded fastener, extending radially outward from said shoulder;

an elastomeric body having a base portion bonded directly to said upper bonding surface and extending upward therefrom;

a sealing member bonded to said lower bonding surface; and a protuberance extending radially outward from said base portion, said protuberance being operative to ensure proper positioning of said jounce bumper.

9. A jounce stop apparatus according to claim 8, wherein said upper bonding surface has circumferential grooves formed therein for improved bonding with said elastomeric body.

10. A jounce stop apparatus according to claim 8, wherein said elastomeric body further comprises a contact face, said contact face having a center portion extending further from said base portion than a periphery of said contact face, thereby providing progressively increased resistance to compression.

11. A jounce stop apparatus according to claim 8, wherein said base portion of said elastomeric body further comprises said protuberance disposed on a periphery of said base portion, said protuberance being operative to prevent rotation of said jounce bumper apparatus during installation.

* * * * *